(12) United States Patent
Wei

(10) Patent No.: US 9,933,591 B2
(45) Date of Patent: Apr. 3, 2018

(54) LENS MODULE

(71) Applicant: Chuandong Wei, Shenzhen (CN)

(72) Inventor: Chuandong Wei, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 30 days.

(21) Appl. No.: 15/358,417

(22) Filed: Nov. 22, 2016

(65) Prior Publication Data

US 2018/0017756 A1   Jan. 18, 2018

(30) Foreign Application Priority Data

Jul. 15, 2016   (CN) .................... 2016 2 0748507 U
Sep. 30, 2016   (JP) ................................ 2016-192601

(51) Int. Cl.
  *G02B 7/02*   (2006.01)
(52) U.S. Cl.
  CPC ............. *G02B 7/021* (2013.01); *G02B 7/022* (2013.01)

(58) Field of Classification Search
  CPC ......... G03B 7/021; G03B 7/022; G03B 7/003
  USPC .................... 359/819, 793–795, 811
  See application file for complete search history.

(56) References Cited

U.S. PATENT DOCUMENTS

| 2014/0204481 A1* | 7/2014 | Chang ................ G02B 7/022 359/793 |
| 2016/0161699 A1* | 6/2016 | Kim .................... G02B 7/021 359/784 |

* cited by examiner

*Primary Examiner* — Ricky Mack
*Assistant Examiner* — Kristina Deherrera
(74) *Attorney, Agent, or Firm* — Na Xu; IPro, PLLC

(57) ABSTRACT

A lens module includes a lens barrel and a lens group accommodated in the lens barrel. The lens group includes a first lens and a second lens, each of the first lens and the second lens including an arc part and a peripheral part around the arc part. A matching structure is formed by the peripheral part of the second lens and the peripheral part of the first lens. By virtue of the matching structure, the lens module of the present disclosure has a high concentricity.

10 Claims, 3 Drawing Sheets

LENS MODULE

FIELD OF THE INVENTION

The present disclosure relates to a lens module with a bonding structure.

DESCRIPTION OF RELATED ART

With progressive development of technology, electronic devices are developed constantly toward intelligent types. In addition to digital camera, portable electronic devices such as iPad, mobile phone and so on are also equipped with lens module to meet the higher requirements of people on the imaging quality of lens module, higher requirements on the reliability of the products. The reliability of the camera module to a great extent is associated with the stability of the bonding structure of the lens module.

The lens module related to the invention comprises a lens barrel having an optical aperture and a lens group arranged in the lens barrel. The lens group comprises at least two optical lenses. Connections between all optical lenses shall be stable highly; however, it is difficult to ensure the high coaxiality and stability during production and fabrication because eccentricity among the optical lenses is sensitive to optical performance.

Therefore, it is necessary to provide an improved lens module to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 1b is an enlarged view of the circled part A in FIG. 1a.

FIG. 4b is an enlarged view of the circled part A' in FIG. 4a.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Embodiment 1

Figure 1A:
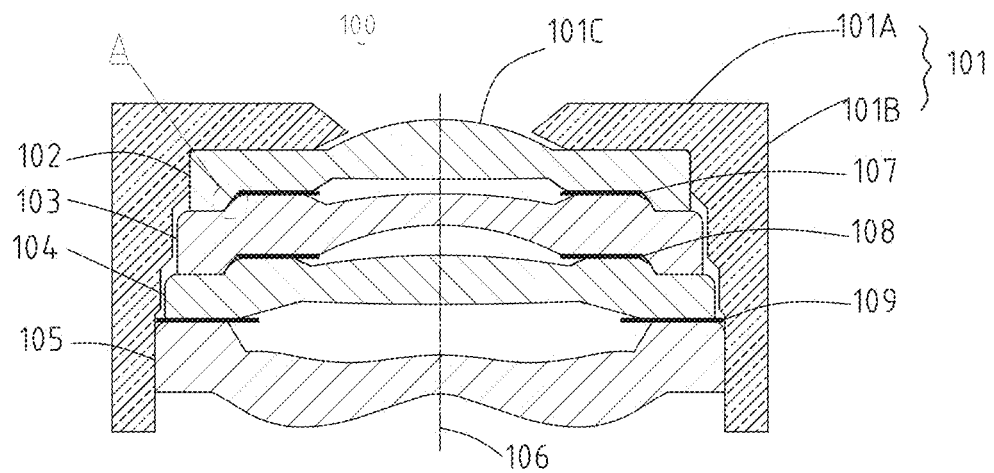
FIG. 1a is an illustration of a lens module in accordance with a first exemplary embodiment of the present disclosure.

As shown in FIG. 1a, a lens module 100, in accordance with a first exemplary embodiment of the present disclosure, includes a lens barrel 101 and a lens group installed in the lens barrel 101 and connected with the lens barrel 101. The lens barrel 101 comprises a first barrel wall 101A with an optical aperture 101C, a second barrel wall 101B extending from the first barrel wall 101A, and an accommodation space 101D formed by the first barrel wall 101A and the second barrel wall 101B. The lens group includes a first lens 102, a second lens 103, a third lens 104 and a fourth lens 105, which are stacked in turn from an object side to an image side. The first lens 102, the second lens 103, the third lens 104 and the fourth lens 105 are arranged axially along the lens barrel 101.

Each of the first lens 102, the second lens 103, the third lens 104 and the fourth lens 105 has an upper surface, a lower surface opposite to the upper surface and a side surface connecting the upper surface and the lower surface. The side surface of the second lens 103 and the third lens 104 is not attached to the second barrel wall 101B. The side surface of the first lens 102 and the fourth lens 105 is attached to the second barrel wall 101B.

Figure 2:
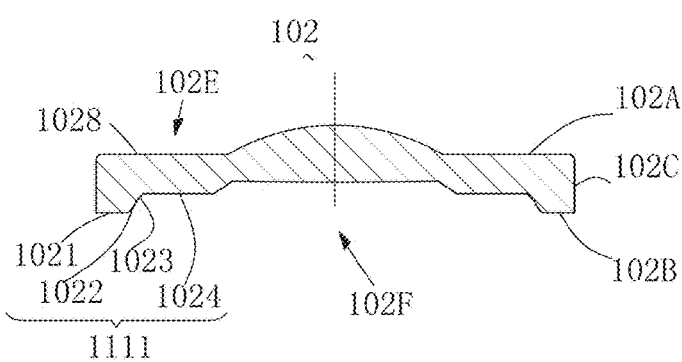
FIG. 2 is an illustration of a first lens of the lens module in the first exemplary embodiment.

As shown in FIG. 2, the first lens 102 includes an upper surface 102A, and a lower surface 102B opposite to the upper surface 102A, and a side surface 102C connecting the upper surface 102A and the lower surface 102B.

Figure 3:
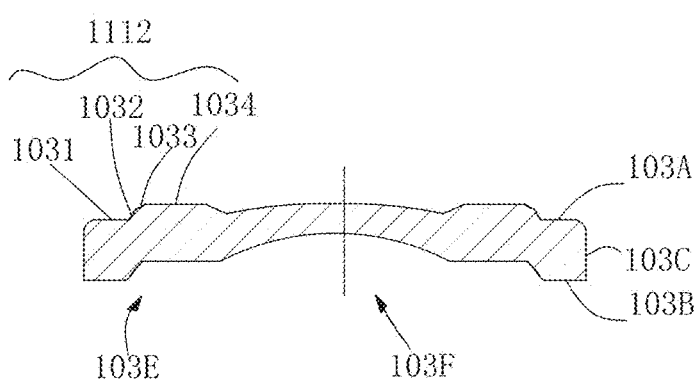
FIG. 3 is an illustration of a second lens of the lens module in the first exemplary embodiment.

As shown in FIG. 3, the second lens 103 includes an upper surface 103A, and a lower surface 103B opposite to the upper surface 103A, and a side surface 103C connecting the upper surface 103A and the lower surface 103B.

Figure 1B:
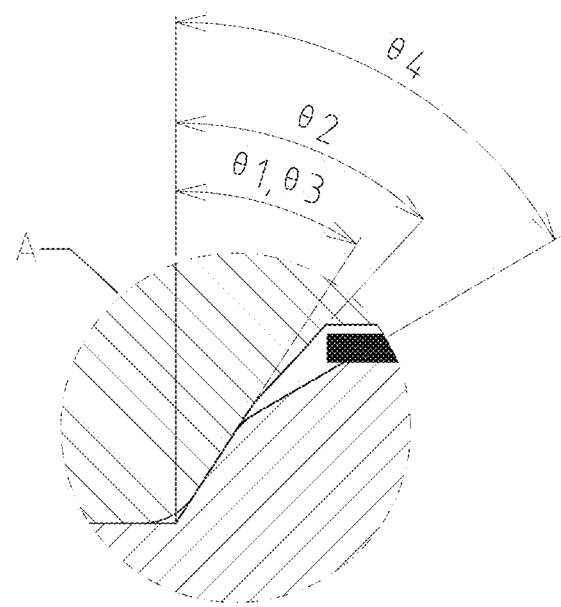
Figure 1C:
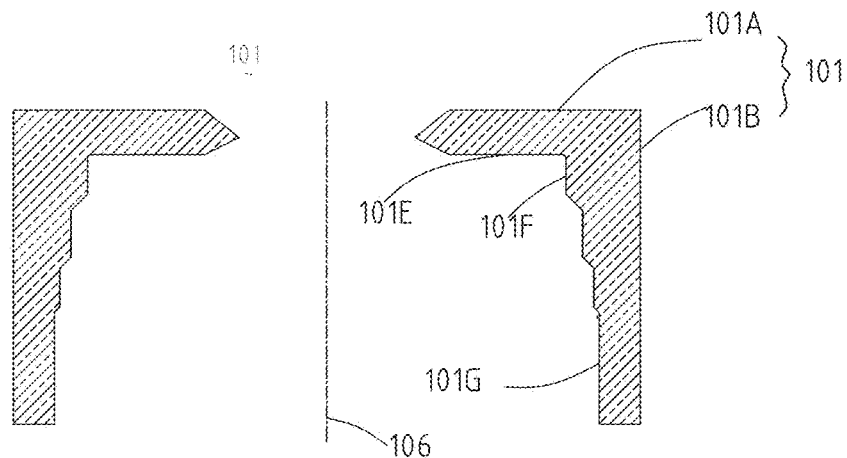
FIG. 1c is an illustration of a lens barrel of the lens module.

As shown in FIG. 1c, the surface of the first barrel wall 101A toward the accommodation space 101D is provided with a first attaching part 101E attached with the upper surface of the first lens. The surface of the second barrel wall 101B toward the accommodation space 101D is provided with a second attaching part 101F attached with the side surface of the first lens 101F, and a third attaching part 101G attached with the side surface of the fourth lens 105. The second attaching part 101F is attached with the side surface of the first lens 102, so the first lens 102 and the lens barrel 101 share one optical axis. The third attaching part 101G is attached with the side surface of the fourth lens 105, so the fourth lens 105 and the lens barrel 101 share one optical axis.

As shown in FIG. 2, the first lens 102 includes an optical imaging portion 102F and a peripheral portion 102E around the optical imaging portion 102E. The peripheral portion 102E is installed with a first matching part 1111. The first matching part 1111 comprises, in turn along the edge of the first lens 102 toward its optical axis, a first plane 1021 extending horizontally, a first slope 1022 extending non-horizontally from the first plane 1021 toward the object side, a second slope 1023 extending non-horizontally from the first slope 1022 toward the object side, a second plane 1024 extending horizontally from the second slope 1023.

As shown in FIG. 3, the second lens 103 includes an optical imaging portion 103F and a peripheral portion 103E around the optical imaging portion 103F. The peripheral portion 103E is installed with a second matching part 1112. The second matching part 1112 comprises, in turn along the edge of the second lens 103 toward its optical axis, a third plane 1031 extending horizontally, a third slope 1032 extending non-horizontally from the third plane 1031 toward the object side, a fourth slope 1033 extending non-horizontally from the third slope 1032 toward the object side, and a fourth plane 1034 extending horizontally from the fourth slope 1033.

As shown in FIGS. 1a and 1b, the first matching part 1111 and the second matching part 1112 form a matching structure 111, so the second lens 103 is located in the lens barrel 101. In other words, the peripheral portion 103E of the second lens 103 and the peripheral portion 102E of the first lens 102 are formed into the matching structure 111 and positioned in the lens barrel 101, so the second lens 103 and the first lens 102 share one optical axis. Among them, the first plane 1021 and the third plane contact each other. The first slope 1022 and the third slope 1032 contact at least partially. A hollow gap is formed between the second slope 1023 and the fourth slope 1033 for light extinguishing and reducing stray light. The second plane 1024 and the fourth plane 1034 are separated opposite to each other.

A first angle θ1 is formed between the first slope 1022 and the optical axis, meeting 0°≤θ1<90° and reducing the deformation of the lenses while assembling. A second angle θ2 is formed between the second slope 1023 and the optical axis, meeting 0°≤θ2<90°. A third angle θ3 is formed between the third slope 1032 and the optical axis, meeting 0°≤θ3<90° and reducing the deformation of the lenses while assembling. A fourth angle θ4 is formed between the fourth slope 1033 and the optical axis, meeting 0°≤θ4<90°.

The gradient of the first slope 1022 is not equal to the gradient of the second slope 1023. In other embodiments, the gradient of the first slope 1022 can be also equal to the gradient of the second slope 1023. However, when the gradient of the first slope 1022 is equal to the gradient of the second slope 1023, the gradient of the third slope 1032 is not be equal to the gradient of the fourth slope 1033.

In this embodiment, the gradient of the third slope 1032 is not equal to the gradient of the fourth slope 1033. In other embodiments, the gradient of the third slope 1032 can be also equal to the gradient of the fourth slope 1033. However, when the gradient of the third slope 1032 is equal to the gradient of the fourth slope 1033, the gradient of the first slope 1022 is not equal to the gradient of the second slope 1023.

A first shade 107 is provided between the second plane 1024 of the first lens 102 and the fourth plane 1034 of the second lens 103, and is used for blocking excessive light of the peripheral portion, reducing stray light. The first shade 107 is a hollow ring. In this embodiment, the first shade 107 is made by black plastic material. In other embodiments, the first shade can be made by other material, used for reducing stray light.

Similarly, the second lens 103 and the third lens 104 are positioned also by same matching structure, so the third lens and the second lens share one optical axis and can be installed also stably in the lens barrel.

A second shade 108 is installed between the second lens 103 and the third lens and is used for blocking excess light of the peripheral portion, reducing stray light. The second shade 108 is a hollow ring. In this embodiment, the second shade 108 is made by black plastic material. In other embodiments, the second shade can be made by other material and is used for reducing stray light.

A shading board 109 is installed between the third lens 104 and the fourth lens 105. The shading board 109 is a hollow ring and used for blocking stray light and improving stability of assembling also. In this embodiment, the shading board 109 is made by plastic material. In other embodiments, the shading board can be made by other material, such as metal.

Embodiment 2

Figure 4A:
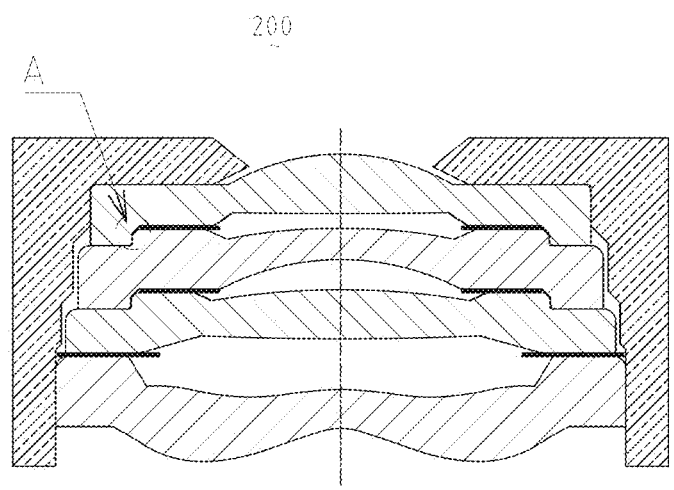
FIG. 4a is an illustration of a lens module in accordance with a second exemplary embodiment of the present disclosure.
Figure 4B:
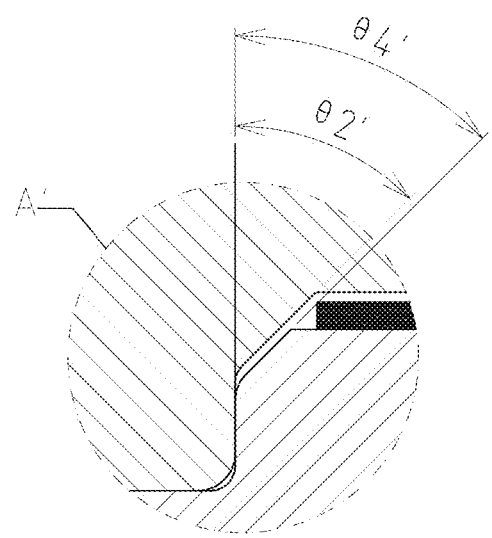

As shown in FIGS. 4a, 4b, the components and functions of a lens module 200 are as same as embodiment 1. The difference is as follows: In this embodiment, the first angle θ1=0° and the third angle θ3=0° further reduce deformation of the lenses in assembling and further improve the stability in assembling.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module having an optical axis, including:
   a lens barrel;
   a lens group accommodated in the lens barrel, and including a first lens and a second lens which are arranged in an order from an object side to an image side, the first lens and the second lens each including an optical imaging portion and a peripheral portion around the optical imaging portion;
   a matching structure positioned in the lens barrel, and including:
   a first matching part on the peripheral portion of the first lens, the first matching part including in turn along the edge of the first lens toward the optical axis a first plane extending horizontally, a first slope extending from the first plane toward the object side, a second slope extending from the first slope toward the object side, and a second plane extending horizontally from the second slope;
   a second matching part on the peripheral portion of the second lens, the second matching part including in turn along the edge of the second lens toward the optical axis a third plane contacting with the first plane, a third slope extending from the third plane to the object side, a fourth slope extending from the third slope toward the object side, and a fourth plane extending horizontally from the fourth slope;
   wherein the first slope at least partially contacts with the third slope; a hollow gap is formed between the second slope and the fourth slope; and the second plane and the fourth plane are opposite to each other.

2. The lens module as described in claim 1, wherein the lens barrel includes an internal wall and an external wall opposite to the internal wall; the second lens is separated from the internal wall of the lens barrel.

3. The lens module as described in claim 2, wherein a gradient of the first slope of the first lens is equal to a gradient of the second slope, while a gradient of the third slope of the second lens is not equal to a gradient of the fourth slope.

4. The lens module as described in claim 2, wherein a gradient of the third slope of the second lens is equal to a gradient of the fourth slope, and a gradient of the first slope of the first lens is not equal to the gradient of the second slope.

5. The lens module as described in claim 3, wherein a first angle is formed between the first slope and the optical axis; and the first angle is less than 90°.

6. The lens module as described in claim 3, wherein a second angle is formed between the second slope and the optical axis; and the second angle is less than 90°.

7. The lens module as described in claim 3, wherein a third angle is formed between the third slope and the optical axis; and the third angle is less than 90°.

8. The lens module as described in claim 3, wherein a fourth angle is formed between the fourth slope and the optical axis, and the fourth angle is less than 90°.

9. The lens module as described in claim 1 further comprising a shade located between the second plane of the first lens and the fourth plane of the second lens.

10. The lens module as described in claim 1, wherein the lens group further comprises at least a third lens located under the second lens; a matching structure between the second lens and the third lens adjacent to the second lens locates the third lens in the lens barrel.

\* \* \* \* \*